United States Patent [19]

Rhodes, Jr.

[11] Patent Number: 4,518,905

[45] Date of Patent: May 21, 1985

[54] CURRENT CONTROL OF SYNCHRO POWER AMPLIFIERS

[75] Inventor: William D. Rhodes, Jr., Cedar Rapids, Iowa

[73] Assignee: Rockwell International Corporation, El Segundo, Calif.

[21] Appl. No.: 495,187

[22] Filed: May 16, 1983

[51] Int. Cl.[3] ................................................ G05B 1/06

[52] U.S. Cl. .................................... 318/661; 318/563; 361/23; 364/184

[58] Field of Search ............... 318/654, 658, 661, 563; 340/347 SY; 364/184; 361/23

[56] References Cited

U.S. PATENT DOCUMENTS

| | | | |
|---|---|---|---|
| 2,734,160 | 2/1956 | Franks et al. | 318/308 |
| 4,000,449 | 12/1976 | Gripp | 318/655 X |
| 4,106,013 | 8/1978 | Cronin | 340/27 |
| 4,151,452 | 4/1979 | Yonescu | 318/654 X |
| 4,268,786 | 5/1981 | Rohrle | 318/661 |
| 4,352,050 | 9/1982 | Sakano | 318/632 |
| 4,375,636 | 3/1983 | Stack et al. | 318/661 X |
| 4,390,865 | 6/1983 | Laurd | 318/661 X |

*Primary Examiner*—B. Dobeck

*Attorney, Agent, or Firm*—Edward A. Gerlaugh; George A. Montanye; H. Fredrick Hamann

[57] ABSTRACT

A synchro system having a microprocessor control element emulating a synchro transmitter. Current sensing circuits measure current developed in a synchro receiver responsive to drive signals generated by the microprocessor control element; the microprocessor control element alters the drive signals to maintain control of current dissipated in the synchro receiver within predetermined limits.

12 Claims, 4 Drawing Figures

CURRENT CONTROL OF SYNCHRO POWER AMPLIFIERS

The invention described herein was made in the course of or under a contract with the Department of the Air Force and may be manufactured, sold, and used for U.S. Government purposes without the payment of royalty thereon.

BACKGROUND OF THE INVENTION

This invention relates to electrical motive power control systems, and, more particularly, to positional synchro systems having power amplifier current limiting.

Devices which rely generally on magnetic coupling for measuring the difference between a desired shaft angle and a controlled shaft angle, and convert the difference into an electrical actuating signal are known variously as synchros, differential transformers, E transformers, linear transformers, and pickoffs, depending on their construction.

Synchro systems are used extensively in avionics. Excessive power dissipation in synchro systems is a persistent problem. For example, if a transmitting synchro and an identical receiving synchro or repeater are independently set to the same angular position, their respective rotors excited and the stators connected together, neither unit experiences an increase in rotor excitation current until one of the rotors is moved from the original position. When either unit is so rotated, the power in each rotor increases by the same amount. If, however, one or more additional identical repeater synchros are connected in parallel with the first two, the power in each synchro rotor will depend upon the angular departure of that rotor from the average position of all the synchros. This is because the restoring torque on any one synchro tends to move the one synchro toward a position corresponding to a stator field vector. The stator field vector is the resultant of all the field vectors of the synchros connected to the system. The power necessary to produce the restoring torque must come from the rotors of the synchros and each rotor supplies a portion of the power corresponding with the degree of angular displacement from the resultant field vector position. Consequently, in a system having more than two identical synchros, one of the synchros moved from a common at-rest position must supply most of the power to move the other synchros, and, if due to abnormal friction the other synchros fail to reach the desired positions, the transmitting synchro will continue to supply more power to the system than any of the other synchros. On the other hand, if all except one of the repeater synchros move easily and the one repeater lags considerably due to friction, the other synchros will take up a position approximately half way between the positions of the transmitter and the defective repeater, in which case the transmitter and the defective repeater will each supply half the total power in the system. In prior art systems employing multiple repeaters, the transmitting synchro is larger and has more heat dissipating area and lower internal resistance than other synchros in the system. Even with a transmitting synchro considerably larger than any of the repeaters, the heating of the transmitter may be the limiting factor in the load capability of the system, rather than reduced accuracy limiting the load on the system.

When a synchro transmitter is coupled to one or more repeater synchros, the stator line currents will normally be extremely small because the repeater synchros are pulled to the resultant position, reducing these line currents to small values. Thus, the additional power dissipated by the transmitting synchro is only slightly greater than the power that would be dissipated by the same transmitting synchro if the stator leads were open-circuited. Thus, it would be theoretically possible to add an infinite number of direct driven repeaters without increasing the load on the transmitting synchro if all of the repeaters were initially set to the proper common position before power was first turned on. It is this last requirement that may actually limit the number of repeater synchros which can be driven by a transmitter, viz.: the number of synchros which can be turned 90° to the position of the transmitter and pulled into synchronism by the transmitter when the power is first applied. Further, a synchro system is limited by a requirement that any one repeater synchro in the system should be incapable of causing a failure in any part of the synchro system as a result of a locked rotor.

A typical synchro power amplifier, e.g., for driving three to five synchro loads, dissipates considerable power even when the synchro loads are matched to the synchro driver. Power can easily double for mismatched conditions. Protection of the drive circuit against large synchro drive requirements, i.e., those caused by a sticky synchro, severe phase or amplitude mismatch, etc., was provided in the prior art by a current limiting resistance in series with the load. The resistance comprised a tungsten filament lamp having a rating such that it became luminous when the load current increased to a limiting value, thereby additionally providing a visual indication of the overcurrent condition. See, for example, U.S. Pat. Nos. 2,734,160 and 4,106,013.

The design approach of the prior art was to build high current synchro power amplifiers on metal boards utilizing heat sinks for maximum heat transfer; stated otherwise, mismatch conditions were simply tolerated. The current-limiting resistor and light bulb, while effective for limiting current, contributed to the problem of excessive power dissipation.

It is therefore an object of the instant invention to provide an improved synchro system having current control.

It is another object of the present invention to provide an improved synchro system having power amplifier current limiting.

It is a more particular object of the present invention to provide improved current control of power amplifiers in a synchro system through a control element which emulates a synchro transmitter, measures instantaneous current in the synchro receiver stators and alters input signals to the servo amplifiers to control the stator currents.

SUMMARY OF THE INVENTION

The foregoing objects are achieved, and a solution of the aforementioned problems encountered in the prior art is provided in accordance with one aspect of the instant invention by a synchro system having a synchro receiver, a digital control element emulating a synchro transmitter for providing drive signals to the synchro receiver, current sensing means for measuring the instantaneous current in the synchro receiver stator windings resulting from the drive signals, the control element altering the drive signals to the synchro receiver in response to the measured current exceeding predetermined limits.

In accordance with another aspect of the present invention, there is provided in a synchro system of the type having a synchro receiver and a digital control element emulating a synchro transmitter, an improved method for initializing the synchro system upon applying power thereto, which comprises assigning an initial arbitrary angular shaft position to the control element, measuring the resultant current in the synchro receiver stator windings, determining in response to the measured currents the synchro receiver shaft position, and commanding the control element to the receiver shaft position before any significant movement of the synchro receiver occurs. Subsequent to initially capturing the synchro receiver, the control element may command the receiver to any desired angular position in a controlled fashion without generating excessive drive currents.

BRIEF DESCRIPTION OF THE DRAWINGS

The invention is pointed out with particularity in the appended claims; however, specific objects, features, and advantages of the invention will become more apparent and the invention will best be understood by referring to the following description of the preferred embodiment in conjunction with the accompanying drawings, in which:

DESCRIPTION OF THE PREFERRED EMBODIMENT

Figure 1:
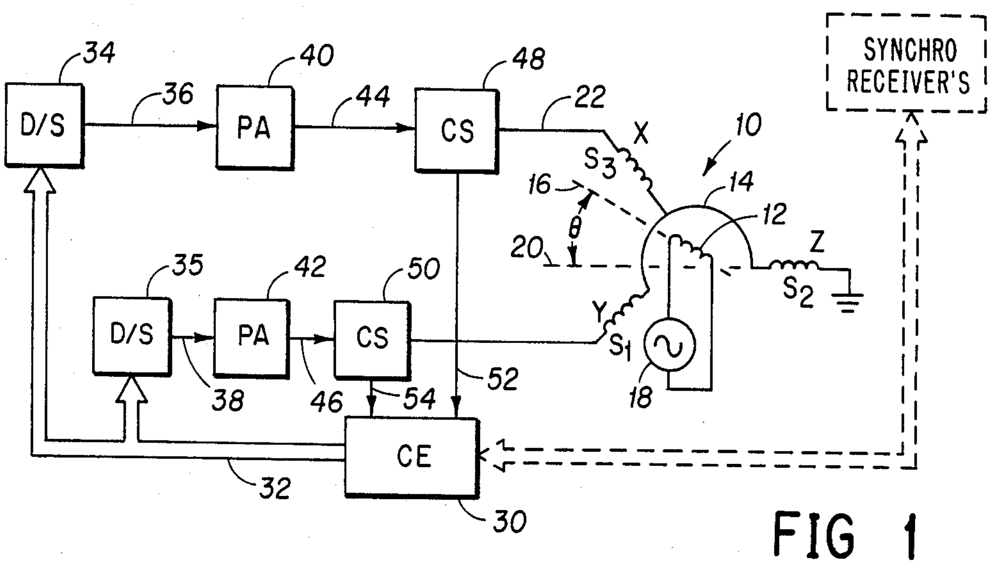
FIG. 1 is a block diagram of a synchro system in accordance with the present invention.

Referring now to the various views of the drawing for a more detailed description of the operation, construction, and other features of the invention by characters of reference, FIG. 1 depicts schematically a synchro receiver 10 having a rotor 12 and a stator 14. The stator 14 construction includes coils $S_1$, $S_2$, $S_3$ (alternatively designated herein, respectively, Y, Z, X), wound in skewed slots distributed around the periphery of the stator. Although the stator windings are distributed, they act as if they were oriented 120° apart, as shown in FIG. 1. The windings X, Y and Z are shown 120° apart in FIG. 1, thus resembling a schematic diagram of a three-phase machine; however, only single-phase voltages appear across any of the windings. Magnetic flux links each of the various coils depending upon the angular position of the rotor 12. The rotor 12 is mechanically connected by a shaft 16 to a rotary device (not shown) which may be, for example, an indicator element of an instrument. The rotor 12 of the synchro 10 is excited with an AC signal, for example, 26 volts, 400 Hz from a source 18. The electrical zero or reference position of the rotor 12, designated schematically by a reference line 20, corresponds to maximum coupling with the turns of the winding Z of the stator 14. When input leads 22, 24 of the synchro receiver 10 are excited with voltages having relative magnitudes and polarities uniquely defining an angle $\theta$, the synchro applies a torque to the shaft 16 which is proportional to the sine of the difference between $\theta$ and the actual angular position of the shaft 16 with respect to the stator 14.

An ARINC standard synchro obeys the following equations:

$$XZ=K\sin(\theta-120°)\cos(\omega t+\alpha) \quad (1)$$

$$YZ=-K\sin(\theta+120°)\cos(\omega t+\alpha) \quad (2)$$

$$XY=-K\sin\theta\cos(\omega t+\alpha) \quad (3)$$

where by definition, X, Y and Z are the root-mean-square values of the voltages applied, respectively, to windings X, Y and Z of a stator to obtain a displacement angle e of a rotor relative to the electrical zero or reference position of the synchro, and $$XZ=X-Z \quad (4)$$

$$YZ=Y-Z \quad (5)$$

$$XY=X-Y \quad (6)$$

Also, $$K=K'\,V_{ref} \quad (7)$$

where K' is the coupling constant for the rotor and a stator winding parallel therewith, and $$V_{ref}=A\cos\omega t \quad (8)$$

where A is the amplitude of the excitation voltage, $\omega$ is the frequency of the applied rotor voltage and t is time. A synchro such as the synchro 10 introduces only a spatial or positional phase shift, and not a phase shift in time; consequently, the terms $\sin(\theta-120°)$, $\sin(\theta+120°)$, and $\sin\theta$ of equations (1), (2) and (3) modulate only the amplitude of the reference $K\cos\omega t$. X, Y and Z differ spatially in phase by $\alpha$ from $V_{ref}$. Since the desired information is contained in the amplitude of the signals, it is convenient and of no consequence to ignore $\alpha$ so that X, Y and Z may be considered to be either in or out of phase with $V_{ref}$. A difference of sign between X, Y or Z and $V_{ref}$ is thus considered as a 180° phase shift.

The signals XZ, YZ, and XY expressed as a function of $\theta$ are:

$$XZ(\theta)=XZ'=K\sin(\theta-120°) \quad (9)$$

$$YZ(\theta)=YZ'=-K\sin(\theta+120°) \quad (10)$$

$$XY(\theta)=XY'=-K\sin\theta \quad (11)$$

Winding Z is grounded in FIG. 1, therefore $\theta$ is solved using only X and Y. Substituting the identity $$\sin(\alpha\pm b)=\sin\alpha\cos b\pm\cos\alpha\sin b \quad (12)$$

in (9) and (10):

$$XZ'=K(\sin\theta\cos 120°-\cos\theta\sin 120°) \quad (13)$$

$$YZ' = -K(\sin\theta\cos 120° + \cos\theta\sin 120°) \quad (14)$$

Adding (13) and (14) yields:

$$XZ' + YZ' = -2K\cos\theta\sin 120° \quad (15)$$

Subtracting (14) from (13):

$$XZ' - YZ' = 2K\sin\theta\cos 120° \quad (16)$$

and dividing (16) by (15) yields:

$$\frac{XY' - YZ'}{XZ' + YZ'} = \frac{\sin\theta\cos 120°}{\cos\theta\sin 120°} \quad (17)$$

$$= -\tan\theta\cot\theta \quad (18)$$

Therefore:

$$\theta = \tan^{-1}(-\tan 120°)\frac{XZ' - YZ'}{XZ' + YZ'} \quad (19)$$

$$\theta = \tan^{-1}\left(\sqrt{3}\ \frac{\left(\frac{XZ'}{YZ'} - 1\right)}{\left(\frac{XZ'}{YZ'} + 1\right)}\right) \quad (20)$$

It is apparent from inspection of equation (20) and its derivation that θ is determined from the instantanous values of XZ' and YZ'. The information representing rotor angular displacement from the reference position is contained in the amplitude of the AC signal inputs of the rotor windings; however, it is not the absolute magnitude of the amplitude which carries the information, but the ratio of the magnitudes of two or more signals. It is noted that the subtraction in equations (4), (5) and (6) effectively removes any common mode term.

In a conventional synchro system, the stator terminals of a synchro receiver such as the synchro receiver 10 of FIG. 1 are connected to corresponding stator leads of a synchro transmitter, and the rotors of both devices are connected to an AC excitation signal source. When the excitation signal is actuated, and if the shaft of the synchro transmitter is held fixed, the shaft of the synchro receiver will rotate until it is oriented at the same angle as the transmitter shaft. If the shaft of the transmitter is then moved, the receiver shaft follows. Referring to FIG. 1, the instant invention utilizes a control element 30 as a transmitter. In the preferred embodiment of the invention, the control element 30 comprises a digital data processor such as a microcomputer and its associated hardware to generate appropriate voltages on the input leads 22, 24 of the X and Y stator coils for controlling the position of the rotor 12. The control element 30 generates a control signal set comprising digital data items, e.g., 16-bit words representing an angular position of a servo transmitter which the control element 30 emulates. The data items are coupled from the control element 30 via a data bus 32 to digital-to-synchro converters 34, 35, each corresponding with a respective one of the X and Y stator leads of the synchro 10. In response to the digital data items, the digital-to-synchro converters 34, 35, generate steady state low-power X and Y synchro drive signals on output leads 36, 38 coupled, respectively, to synchro power amplifiers 40, 42. After amplification in the respective power amplifiers 40, 42, the synchro drive signals are applied, respectively, to the X and Y input leads 22, 24 of the synchro receiver 10 via connections 44, 46 and current sensing circuits 48, 50.

The control element 30 continually measures current in the stator leads and verifies that the current is below a predetermined surge-current limit. If the current is too high, the desired synchro position, θ, is offset to reduce the current. When the current is reduced, the synchro position, θ, is again the driving function. By observing the current profile, the control element 30 can detect a variety of anomalies such as sticky synchros, out-of-tolerance synchro impedance, open or disconnected synchro receivers, etc. The control element 30 can then execute corrective measures such as setting alarms or indicators, disabling drive signals to defective synchros, and further, estimate power impact of the synchro system based on the measured current.

The current sensing circuits 48, 50 detect the magnitude of current flowing in each of the X and Y stator leads resulting from the drive signals applied thereto from the power amplifiers 40, 42; signals generated by the current sensing circuits 48, 50 representing the instantaneous current magnitudes are coupled to the control element 30 via connections 52, 54. The control element 30 in response to the signals from the current sensing circuits determines the shaft position of the synchro receiver 10. FIG. 1 is thus analogous to a pair of interconnected synchros.

When power is first applied in a conventional synchro system, the synchro receivers are generally in a different electrical position than the synchro transmitting elements, therefore high currents are developed in the stator windings. The high currents produce a high torque in the synchro receivers for moving the rotors into the correct electrical position. The development of excessive torque can cause over-shooting the correct position resulting in oscillation or hunting in the synchro receiver. The relative difference between the rotor positions of the synchro transmitting element and the synchro receiver determines the maximum current in each of the stator windings, e.g., when the commanded shaft position and the synchro receiver shaft position are 180° apart, maximum stator currents are developed. Because all stator lines are affected similarly, little valuable information concerning the position of the synchro receiver can be determined. In the present invention, the control element 30 emulates a synchro transmitter. Upon initial powering up, the control element 30 assigns itself an initial position, thus developing signals in the current sensing circuits. If the assigned position of the control element and the position of the synchro receiver differs, the control element 30, by carrying out equation (20) can determine the mean shaft position between the control element and the synchro receiver. The relationship between mean shaft position, synchro receiver position, and the position of the control element is as follows:

$$\beta = 2\theta - \phi \quad (20)$$

where β is the actual position of the synchro receiver, φ is the predetermined position commanded by the control element, and θ is the mean shaft position. Equation (20) becomes even simpler if the predetermined position of the control element is always 0° at power-up. Determining the actual synchro receiver shaft position then requires only a multiplication by two, i.e., a left shift one bit. When the actual position of the synchro receiver is thus determined, commanding the control element to the position of the synchro receiver within 2.5 mS (400 Hz) will capture the synchro receiver, and prevent significant receiver movement and the development of excessive currents.

Figure 2:
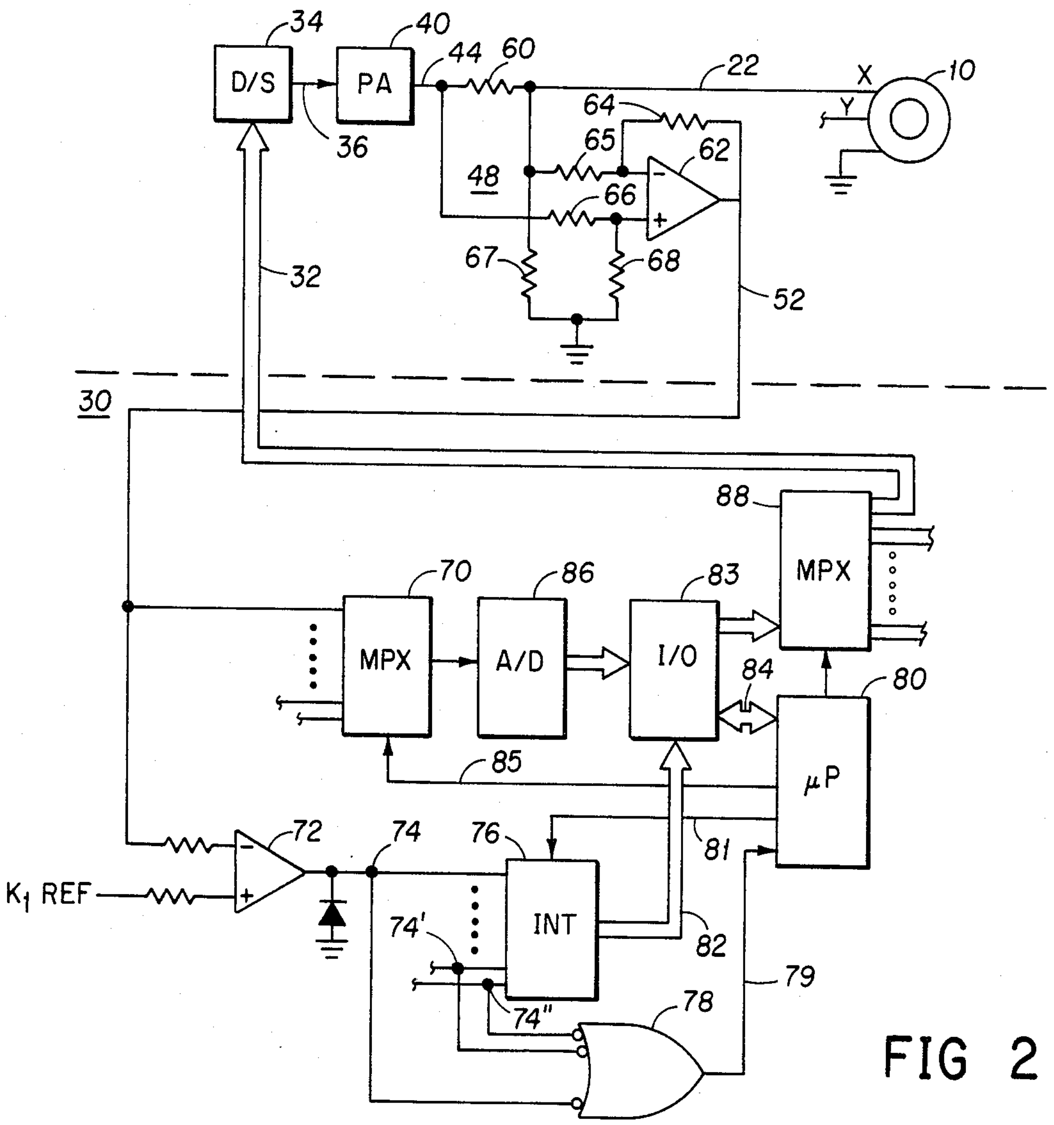
FIG. 2 is a more detailed diagram of the synchro system of FIG. 1.

Referring now to FIG. 2, the synchro system of the present invention is shown in greater detail wherein the current sensing circuit 48 comprises a resistor 60 in series with the X stator winding lead 22 of the synchro 10. The resistor 60 is substantially smaller than the 5 to 12 ohms series current limiting resistance found in prior art synchro systems, the resistor 60 being in the range of 0.1 to 2 ohms. Even at nominal synchro drive currents of 30 milliamps, the use of a smaller resistance achieves a significant power reduction in both X and Y synchro drive lines. The resistor 60 is coupled as shown to an operational amplifier 62 configured as a current-to-voltage converter circuit with resistors 64–68 all having a value of 10 Kohms. A voltage output of the current-to-voltage converter circuit 62 is coupled via the connection 52 to a multiplexer circuit 70 and a threshold detector circuit 72. A predetermined reference voltage $K_1$ REF is applied to another input of the threshold detector circuit 72. The voltage on the connection 52 is representative of the current flowing in the X stator winding of the synchro receiver 10. When the voltage on the connection 52 exceeds the $K_1$ REF voltage, the threshold detector circuit 72 generates an enabling signal at a junction point 74 which is connected as one of eight inputs to a an interrupt latch circuit 76 and to an OR logic element 78. Each of the circuits 70, 76 and the OR logic element 78 receive eight input signals corresponding with the X and Y stator windings of each of four synchro receivers, only one of which synchros is shown in FIG. 2, viz.: the synchro receiver 10. Further, only the individual circuits associated with the X stator winding of the synchro receiver 10 are shown in FIG. 2 for simplicity. The OR logic element 78 generates an interrupt signal on a connection 79 to a microprocessor 80, when the threshold detector circuit 72 senses that the current in the X stator winding has a magnitude greater than a predetermined value represented by the reference voltage $K_1$ REF. Likewise, the OR logic element 78 generates an interrupt signal on the connection 79 when an enabling signal is present on any of the other seven input junction points, e.g. 74', 74'' corresponding with other stator leads in the synchro system of FIG. 2. The signals on the junction points 74, 74' etc. are latched in the interrupt latch circuit 76; the microprocessor 80 in response to an interrupt signal on the connection 79 can determine on which of the stator leads excessive current was sensed by accessing the interrupt latch circuit via a control bus 81, the status of the latches corresponding with each of the eight stator lines being transferred to the microprocessor via a data bus 82, an input/output (I/O) port 83 and a data bus 84. The microprocessor turns off the enabled bit in the interrupt latch circuit, after responding to the over-current condition indicated on the corresponding stator lead.

Each of the voltages input to the multiplexer circuit 70 is measured periodically under control of the microprocessor 80 performing as a background task a power control subroutine described hereinafter with reference to FIG. 3. The microprocessor 80, via a control bus 85, selects one of the signals input to the multiplexer circuit 70 for coupling through an analog-to-digital converter circuit 86 to the I/O port 83 of the microprocessor 80. The measured signal is stored in a data store (not shown) of the microprocessor 80. In response to the signal measured on the line 52, the microprocessor 80 generates an appropriate control data item as described hereinbelow, which is coupled via the I/O port 83 and a multiplexer circuit 88 selecting the data bus 32 to the digital-to-synchro converter 34, thus supplying a drive signal to the power amplifier 40 as previously described with reference to FIG. 1.

Figure 3:
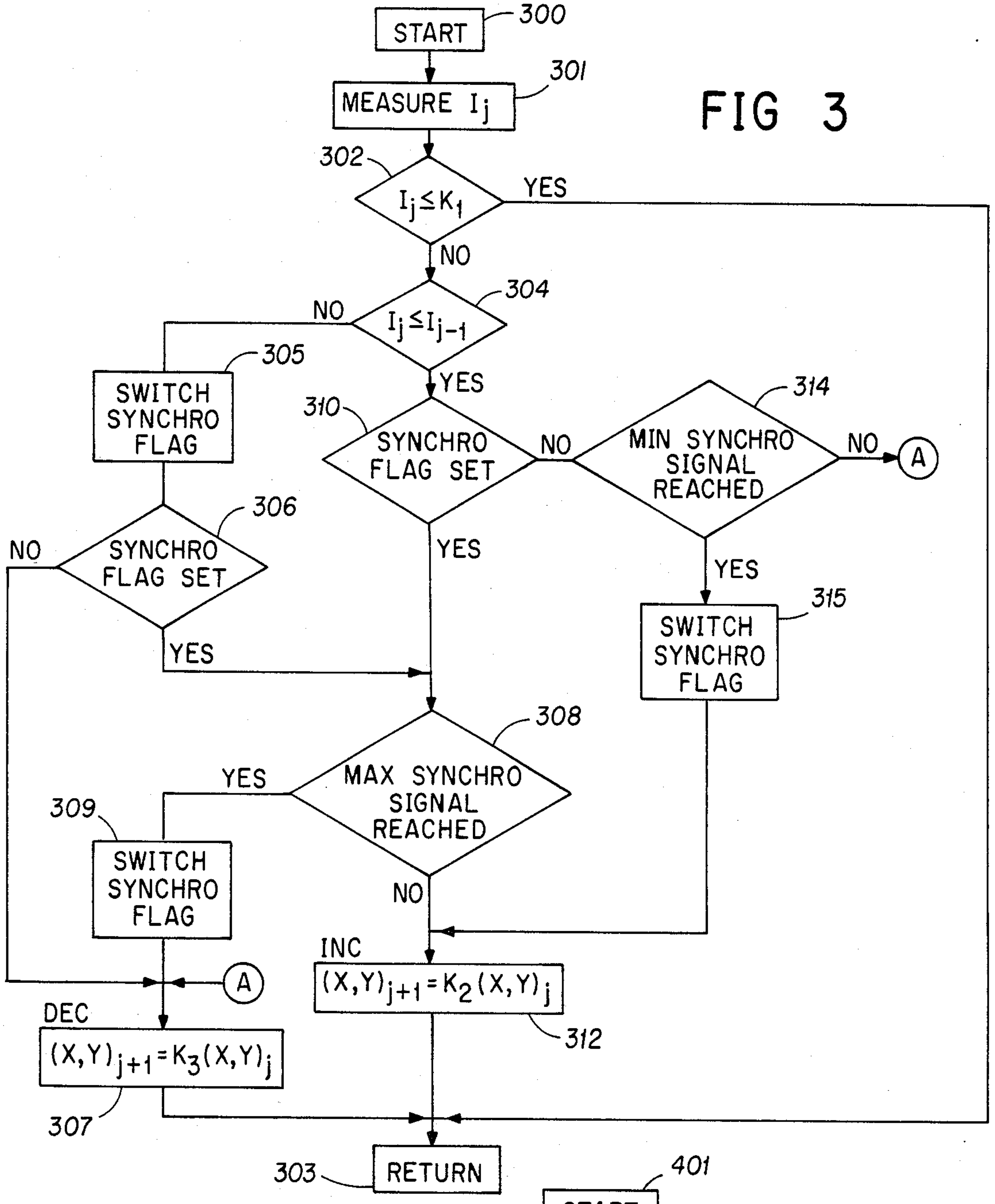
FIGS. 3 and 4 comprise flow charts showing the principle steps executed by the apparatus of the instant invention to control synchro power.

Referring now to FIG. 3 in conjunction with FIG. 2, $I_j$ represents the instantaneous value of synchro drive current at time $t_j$ as measured typically across the resistor 60 and coupled to the multiplexer circuit 70 via the connection 52. $K_1$ represents a predetermined acceptable synchro current level stored in the microprocessor 80. $K_2$ represents a predetermined synchro voltage incremental adjustment factor; $K_3$ is a predetermined synchro voltage decremental adjustment factor, refer to equations (9), (10) and (11). The microprocessor 80 performs the power control subroutine of FIG. 3 as a background task, measuring the current in each of the eight stator windings successively and generating current adjustments.

The power control subroutine is entered as represented by start block 300, FIG. 3, and the current $I_j$ in the selected stator winding is measured, block 301, as previously described with reference to FIG. 2. If $I_j \leqq K_1$, block 302, then the measured current is within the acceptable predetermined synchro current level and the subroutine is exited via RETURN block 303. If the current exceeds $K_1$, the microprocessor, as represented by block 304, compares the measured current $I_j$ with a previously-measured value of stator winding current $I_{j-1}$. If the currently-measured value is greater than the previously measured current, the NO exit is taken from block 304 and the microprocessor switches a synchro flag, block 305. The synchro flag is an indicator, e.g., a bit position in a designated storage location, which may be set or switched into a prescribed state, and which subsequently is used by the microprocessor to determine selection from alternative processes. The synchro flag being set or enabled indicates that the stator winding current being measured is in the process of being incremented. Such determination is made in decision block 306; if the synchro flag is not set, the microprocessor in block 307 decrements the voltage amplitude in the stator winding being measured and exits the subroutine via block 303. Had the synchro flag been set in block 305, the YES branch would have been taken from decision block 306 to block 308 where the microprocessor would have determined that the maximum synchro signal had been reached, the process proceeding to block 309 resetting the synchro flag, then proceeding as previously described to block 307 to decrement the synchro drive voltage amplitude. A YES branch from decision block 304 indicates that the previous current measurement $I_{j-1}$ was greater than the present current measurement $I_j$, i.e., the synchro current is decreasing. Proceeding to decision block 310, if the synchro flag is set, the microprocessor proceeds to decision block 308, and if the maximum synchro signal has not been reached, the microprocessor in block 312 increments the stator winding current and exits the subroutine via block 303. The NO branch from decision block 310 proceeds to decision block 314 where it is determined whether or not a minimum synchro signal has been reached; if not, the microprocessor decrements the stator winding current in block 307. If the minimum synchro signal has been reached as determined in block 314, the microprocessor proceeds to block 315, switching tne synchro flag and then, in block 312, increments the stator winding current and exits the subroutine via block 303.

Figure 4:
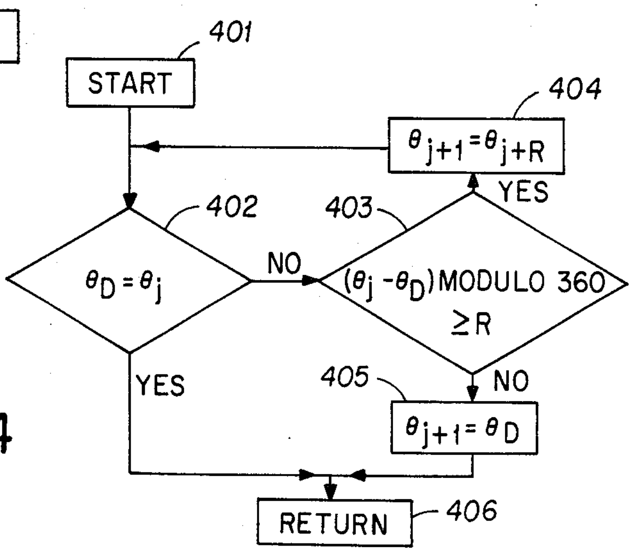

Referring now to FIG. 4, the synchro rate control subroutine is invoked in order to limit the amount of synchro angle increase, when a synchro receiver is commanded to a new angle, thus controlling synchro power dissipation. $(X, Y)_j$ is the X, Y synchro signal at time $t_j$, representing angular displacement of $\theta_j$. $\theta_D$ is the desired synchro angle $(X, Y)_D$. R is the maximum allowable synchro angle increase. Initiating the synchro rate control subroutine at START block 401, the microcomputer determines in decision block 402 whether or not the measured synchro angle $\theta_j$ is equal to the desired synchro angle $\theta_D$. If not, decision block 403 is entered wherein it is determined if the difference between the measured and the desired synchro angle is greater than or equal to R. If so, the angular rate is decreased in block 404; if not, block 405 is entered, the angular rate is within acceptable limits and the subroutine is exited via RETURN block 406. The increase in blocks 404 or 405 is reiterated until the measured synchro angle reaches the desired synchro angle (block 402).

While the principles of the invention have now been made clear in an illustrative embodiment, there will be immediately obvious to those skilled in the art many modifications of structure, arrangement, proportions, the elements, materials and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

I claim:

1. A synchro system, comprising:
a synchro receiver;
a microprocessor control element coupled to said synchro receiver, said microprocessor control element emulating a synchro transmitter and generating a control signal defining an orientation of said synchro receiver commanded by said microprocessor control element; and
a current sensing circuit coupled between said synchro receiver and said microprocessor control element, said current sensing circuit measuring the magnitude of current developed in said synchro receiver responsive to the control signal set generated by said microprocessor control element, said microprocessor control element being responsive to the measured current to alter the control signal current in the synchro receiver within predetermined maximum and minimum limits.

2. A synchro system as claimed in claim 1, comprising:
a digital-to-synchro converter circuit intermediate said microprocessor control element and said current sensing circuit, said digital-to-synchro converter circuit receiving the control signal from said microprocessor control element, said digital-to-synchro converter circuit generating a low-power synchro drive signal.

3. A synchro system as claimed in claim 2, comprising:
a synchro power amplifier intermediate said current sensing circuit and said digital-to-synchro converter circuit, said power amplifier circuit receiving the low-power synchro drive signal and generating an amplified synchro drive signal.

4. A synchro system, comprising:
a synchro receiver;
control means coupled to said synchro receiver for generating a control signal representing a shaft angle of said synchro receiver commanded by said control means, said synchro receiver being responsive to a current flowing in a stator of said synchro receiver resulting from the control signal to generate torque urging a rotor of said synchro receiver to the commanded shaft angle; and
means coupled to said control means for sensing the current flowing in the stator of said synchro receiver, said control means including means for sampling the current, said control means including means responsive to the sampled current for adjusting the magnitude of the control signal to limit power dissipation in said synchro system.

5. The synchro system as claimed in claim 4, wherein said control means further includes means responsive to the current sensing means for detecting current which exceeds a predetermined reference current.

6. A synchro system, comprising:
a plurality of synchro receivers each having a rotor and a stator;
control means coupled to the stator of each of said plurality of synchro receivers for generating a plurality of control signals, each of the plurality of control signals corresponding with a different one of said plurality of synchro receivers and representing a rotor orientation of said one synchro receiver commanded by said control means, each of said plurality of synchro receivers being responsive to a current flowing in the stator thereof resulting from the corresponding control signal to generate torque urging the rotor to the commanded orientation;
means coupled to said control means for sensing the current flowing in the stator of each of said plurality of synchro receivers;
said control means including means for sampling successively the current sensed in the stator of each of said plurality of synchro receivers; and
said control means including means responsive to the successively sensed current for adjusting the magnitude of the corresponding ones of the plurality of control signals to limit power dissipation in said synchro system.

7. In a synchro system having a control element emulating a synchro transmitter and at least one synchro receiver coupled to said control element, a method for initializing said synchro system upon applying power thereto, comprising the steps of:
applying an AC excitation signal to said synchro system;
generating in said control element a signal representing a predetermined angular orientation of said synchro transmitter;
sensing the stator currents in said synchro receiver resulting from the signal generated in said control element;
determining from said sensed stator currents the angular orientation of said synchro receiver; and changing in said control element the previously generated signal to a signal representing the angular orientation of said synchro receiver determined in the preceeding step, before any significant movement occurs in said synchro receiver, thereby capturing said synchro receiver.

8. The method as claimed in claim 7, wherein the signal generated in the generating step represents an angular orientation of zero degrees with respect to a reference position of said synchro receiver.

9. In a synchro system having a control element emulating a synchro transmitter, and at least one synchro receiver coupled to said control element, a method for initializing said synchro system upon applying power thereto, comprising the steps of:

applying an AC excitation signal to said synchro system;

generating in said control element a digital signal representing a predetermined angular orientation of said synchro transmitter;

converting the digital signal to a synchro signal;

sensing the stator currents in said synchro receiver resulting from the converted synchro signal;

determining from said sensed stator currents the angular orientation of said synchro receiver; and changing in said control element the previously generated digital signal to a digital signal representing the angular orientation of said synchro receiver determined in the preceeding step, before any significant movement occurs in said synchro receiver, thereby capturing said synchro receiver.

10. In a synchro system having a control element emulating a synchro transmitter and at least one synchro receiver coupled to said control element, a method of controlling power dissipated in said synchro system, comprising the steps of:

applying an AC excitation signal to said synchro system;

generating an initial synchro drive signal representing a predetermined angular orientation of said synchro transmitter;

applying the initial synchro drive signal to said synchro receiver;

sensing the stator currents in said synchro receiver resulting from the applied initial synchro drive signal;

determining from said sensed stator currents the angular orientation of said synchro receiver; and changing in said control element the previously generated initial synchro drive signal to a synchro drive signal representing the angular orientation of said synchro receiver determined in the preceeding step, before any significant movement occurs in said synchro receiver, thereby capturing said synchro receiver.

11. In a synchro system having a control element emulating a syhchro transmitter and a synchro receiver coupled to said control element, a method of controlling power dissipated in said synchro system, comprising the steps of:

initializing said synchro system;

generating a synchro drive signal representing a desired shaft position of said synchro receiver;

sensing the stator currents in said synchro receiver resulting from the generated synchro drive signal;

determining in said control element if the sensed stator currents exceed a predetermined maximum limit; and decrementing the synchro drive signal by a predetermined adjustment factor if the sensed stator currents exceed the predetermined maximum limit.

12. The method as claimed in claim 11, comprising the additional steps of:

sensing the stator currents in said synchro receiver resulting from the decremented synchro drive signal;

determining in said control element if the stator currents sensed in the preceding step are increasing or decreasing relative to the previously sensed stator currents;

further decrementing the synchro drive signal if the sensed stator currents are decreasing; and incrementing the synchro drive signal by a predetermined adjustment factor if the sensed stator currents are increasing.

* * * * *